United States Patent [19]
Zimmerman

[11] 4,401,314
[45] Aug. 30, 1983

[54] RECREATIONAL TOY WHEEL VEHICLE

[75] Inventor: Thomas H. Zimmerman, Greenfield, Wis.

[73] Assignee: Sandra Mae Zimmermann, Greenfield, Wis. ; a part interest

[21] Appl. No.: 225,655

[22] Filed: Jan. 16, 1981

[51] Int. Cl.³ .............................................. B62K 1/00
[52] U.S. Cl. ..................................... 280/206; 280/78
[58] Field of Search ................. 280/78, 206, 207, 208; 272/115, 33 R; 104/69, 118, 119

[56] References Cited

U.S. PATENT DOCUMENTS

| D. 190,038 | 4/1961 | Nickell et al. | 280/207 |
|---|---|---|---|
| 2,019,728 | 11/1935 | Ranck | 280/206 |
| 2,399,874 | 5/1946 | Livingston | 280/206 |
| 3,858,517 | 1/1975 | Luck et al. | 104/69 |
| 3,908,556 | 9/1975 | Stuhmer | 104/69 |
| 4,246,846 | 1/1981 | Betschart | 104/119 |

Primary Examiner—Joseph F. Peters, Jr.
Assistant Examiner—Ross Weaver
Attorney, Agent, or Firm—Michael, Best & Friedrich

[57] ABSTRACT

A recreational toy wheel vehicle comprises a generally annular outer wheel member having an outer peripheral rolling surface and a generally smooth inner peripheral surface area defining a generally circular, axially extending interior cavity. A carriage member has a passenger carrying seat and a series of generally smooth rib members which contact the generally smooth inner surface area of the wheel member. The generally smooth inner surface area of the wheel member and the generally smooth rib members are fabricated of materials which minimize the coefficient of sliding, or kinetic, friction therebetween. Relatively frictionless or gliding contact between the two materials thus occurs, so that the carriage member is supported in a non-rotating position within the interior cavity during rotation of the outer wheel member on the rolling surface.

8 Claims, 4 Drawing Figures

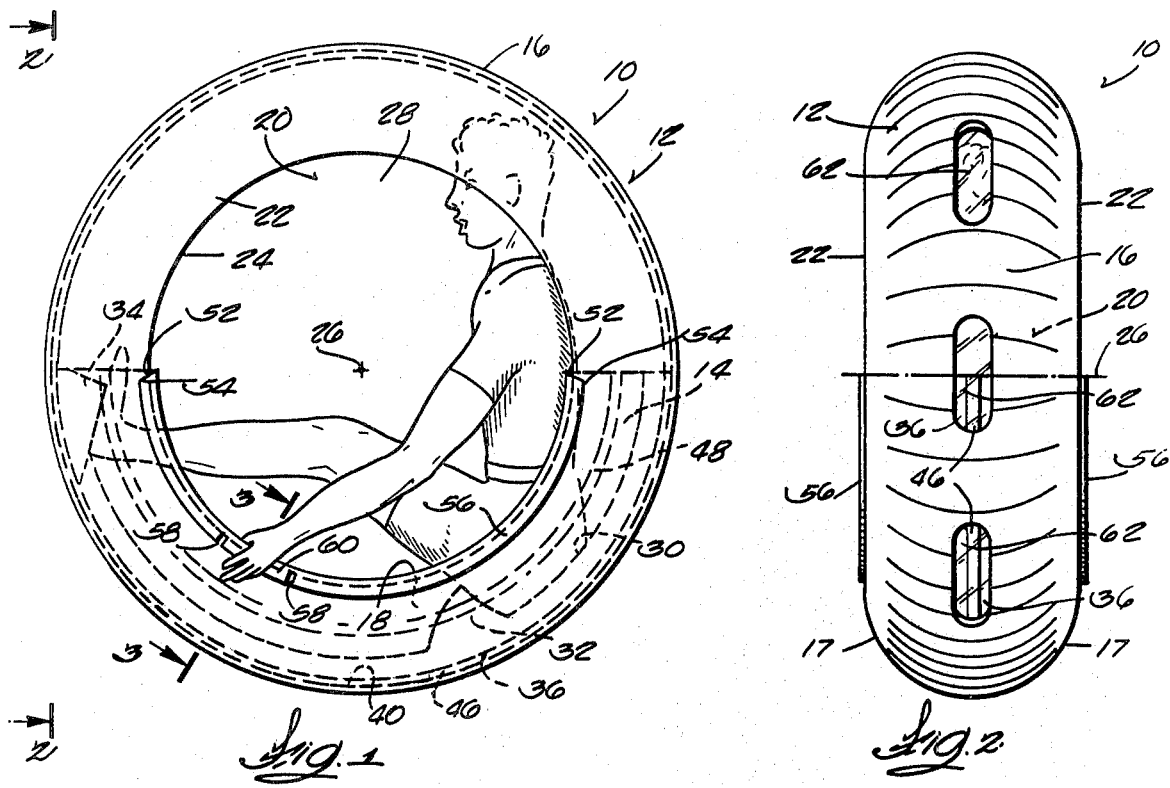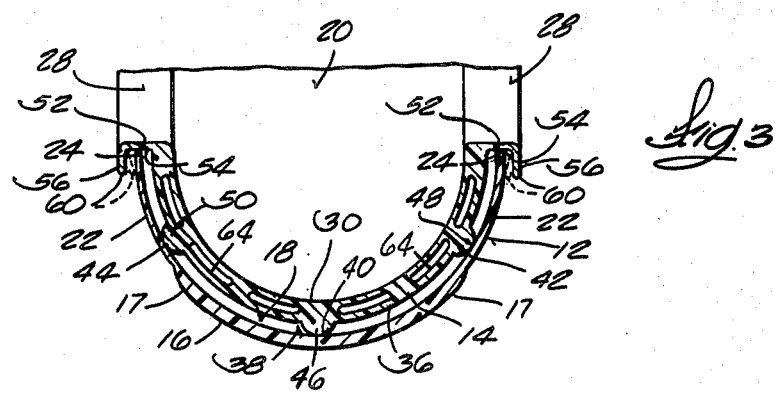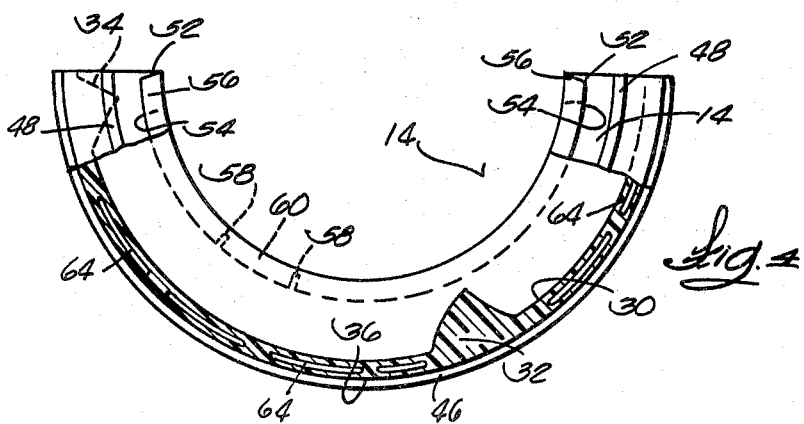

RECREATIONAL TOY WHEEL VEHICLE

BACKGROUND OF THE INVENTION

The invention relates generally to recreational vehicles, and more particularly, to recreational toy vehicles suited for use by children and the young at heart.

DESCRIPTION OF THE PRIOR ART

Devices which emloy a rotatable outer wheel in which a passenger carrying member is supported in a non-rotating position on roller bearings are known and disclosed in the following United States Patents:

Mattison U.S. Pat. No. 475,130, May 17, 1892,
Moore U.S. Pat. No. 1,625,327, Apr. 19, 1927,
Marten U.S. Pat. No. 2,002,205, May 14, 1935,
Livingston U.S. Pat. No. 2,399,874, May 7, 1946,
Body U.S. Pat. No. 3,013,806, Dec. 19, 1961,
Gehring U.S. Pat. No. 3,338,593, Aug. 29, 1967,
Dittman U.S. Pat. No. 3,420,545, Jan. 17, 1969,
Aguilar U.S. Pat. No. 3,575,443, Apr. 20, 1971.

Attention is also directed to the device disclosed in U.S. Pat. No. 3,905,617, issued Sept. 16, 1975. In this device, a passenger sits within a wheel and is carried head-over-heels in the wheel as it rotates. A braking assembly is provided which can be selectively extended outwardly from the rolling surface of the wheel to slow and eventually stop the rotation of the wheel.

All of the above prior art devices are mechanically complex in design and operation and include numerous moving parts which substantially increase the likelihood of mechanical failure. Also, by virtue of their complexity, repair of such devices is time consuming and costly.

SUMMARY OF THE INVENTION

It is a principal object of this invention to provide a structurally rugged, comfortable, and safe toy wheel vehicle in which a passenger carrying member is supported in a non-rotating position within a rotating outer wheel member without the use of mechanically complex arrangements. The accomplishment of this object serves to significantly simplify the construction, operation, and repair of the vehicle.

To achieve this and other objects, the invention provides, in its preferred embodiment, a recreational toy wheel vehicle which comprises a generally annular outer wheel member fabricated from a high density polyolefinic compound and an arcuately shaped inner carriage member which is fabricated from a non-polyolefinic compound and on which a passenger can be comfortably seated. The outer wheel member has a generally smooth inner peripheral surface area which defines a generally circular, axially extending cavity. The carriage member is carried within the cavity upon generally smooth rib means which, by virtue of the relatively low coefficient of kinetic friction between the polyolefinic and non-polyolefinic compounds, makes relatively frictionless, gliding contact with the generally smooth inner peripheral surface area of the wheel member. The gliding contact between the rib means of the carriage member and the inner surface area of the cavity maintains the carriage member in an upright, non-rotating position during rotation of the outer wheel member without the use of mechanically complex roller bearing arrangements.

Also in the preferred embodiment, the wheel member includes an outer peripheral rolling surface. Spaced sidewalls respectively extend from opposite lateral sides of the rolling surface. Each of the sidewalls includes a generally smooth inner edge which is radially spaced about the rotational axis of wheel member and which peripherally defines a generally circular opening providing access into the interior cavity. In this embodiment, the carriage member includes lip means making gliding contact with each of the sidewall inner edges. The lip means is operative in combination with the rib means for supporting the carriage member in its non-rotating position in the interior cavity. In this embodiment, the lip means includes a hooked end portion which overlies a portion of the respective wheel member sidewall and provides a hand rest for a passenger seated on the carriage member.

Also in the preferred embodiment, the hooked end portion of the lip means includes a resilient breaking portion which is selectively operative by the passenger for rubbing engagement against the adjacent sidewall portion to impede rotation of the outer wheel member.

Also in the preferred embodiment, the carriage member is generally semi-circular in shape and lends itself for easy insertion into and removal from the interior cavity through the access opening for repair and replacement.

Additional features of the invention will be apparent from the following general description, drawings, and appended claims.

DESCRIPTION OF THE DRAWINGS

FIG. 1 is a side view of a recreational toy wheel vehicle which embodies the features of the invention;

FIG. 2 is front or end-on view of the vehicle taken generally along line 2—2 in FIG. 1;

FIG. 3 is a section view of the interior of the vehicle taken generally along line 3—3 in FIG. 1; and FIG. 4 is a side view, with parts broken away and in section, of the carriage member in a position removed from outer wheel member of the vehicle.

DESCRIPTION OF THE PREFERRED EMBODIMENT

A recreational toy wheel vehicle 10 is shown in the drawings. Generally, and as best shown in FIG. 1, the vehicle 10 comprises a generally annular outer wheel member 12 in which an arcuately shaped carriage member 14 is supported. In use, a passenger may be comfortably seated in an upright and non-rotation position on the carriage member 14 for travel within the wheel member 12.

More particularly, the wheel member 12 includes an outer peripheral rolling surface 16 (see FIG. 2) and an inner surface area 18 (see FIG. 3). The inner surface area 18 peripherally defines a generally circular, axially extending interior cavity 20.

The wheel member also includes a pair of sidewalls 22 vertically extending from opposite lateral sides 17 of the rolling surface 16. In the illustrated embodiment (see FIGS. 2 and 3), the lateral sides 17 of the rolling surface 16 are generally rounded at the point of intersection with the sidewalls 22 so that the inner peripheral surface area 18 of the wheel member 12 is generally U-shaped transversely of the path of intended wheel member rotation.

Each of the sidewalls 22 includes an inner edge 24 (see FIG. 1) which is radially spaced about the rotational axis 26 of the wheel member. Each edge 24 peripherally defines a generally circular opening 28 providing passenger across into the interior area of the cavity 20.

The wheel member 12 is preferably made of an opaque material. In this construction, to provide the passenger seated on the carriage member 14 a view of the road ahead, the wheel member 12 includes a plurality of translucent windows 62 arcuately spaced about the rolling surface 16. These translucent windows 62 are preferably made of a high density translucent plastic material and communicate with the interior cavity 20.

Reference is now made to the carriage member 14. While various construction are possible, in the illustrated embodiment, the carriage member 14 is substantially semicircular in shape, having an outer diameter generally equal to the inner diameter of the circular interior cavity 20 of the wheel member 12. The carriage member 14 is also generally U-shaped transversely of a major arc thereof (see FIG. 3) and thus nests substantially within the generally U-shaped inner peripheral surface area 18 of the interior cavity 20.

In this construction (see FIGS. 1 and 4), the carriage member 14 includes an upper body surface 30 which includes a passenger carrying seat 32 and foot rest 34. The carriage member 14 also includes an oppositely facing underbody surface 36. The underbody surface 36 includes integrally formed rib means 38 (see FIG. 3) which contacts the inner peripheral surface area 18 of the wheel member 12 to support the carriage member 14 in the interior cavity 20.

To assure that the carriage member 14 is maintained in an upright and non-rotating position during outer wheel rotation, the materials from which the wheel member 12 and carriage member 14 are fabricated are preselected with the purpose of minimizing to the greatest extent possible the coefficient of sliding, or kinetic, friction between the rib means 38 and the inner surface area 18. In addition, the finished condition of each of the gliding surfaces (i.e. of the inner peripheral surface area 18 and the rib means 38) is polished or smoothed to the greatest extent possible to further minimize the coefficient of friction.

In the preferred embodiment, the wheel member 12 is preferably manufactured by rotational molding from a high density and high molecular weight polyolefinic compound, such as polypropylene, polyethylene, or copolymers thereof. The carriage member 14 is also preferably manufactured by rotational molding but from a non-polyolefinic compound, such as acrylonitrile butadiene styrene (ABS).

Because of the relatively low coefficient of friction between the polyolefinic and non-polyolefinic compounds, the generally smooth rib means 38 makes relatively frictionless or gliding contact with the generally smooth inner peripheral surface area 18 to permit rotation of the wheel member 12 about and relative to the carriage member 14. The carriage member 14 is thus supported by the rib means 38 in an upright and non-rotating position (shown in FIG. 1) during rotation of the wheel member 12 on its rolling surface 16.

In the illustrated construction (see FIG. 3), the generally smooth inner surface area 18 of the wheel member 12 includes a first generally smooth glide surface which extends along the major arc thereof, as well as second and third generally smooth glide surfaces 42 and 44 which respectively extend along opposite sides of the first glide surface 40. More particularly, the first glide surface 40 extends generally parallel to and on the opposite side of the rolling surface 16, and the second and third glide surfaces 42 and 44 extend along the interior surfaces of sidewalls 22 of the wheel member 12.

In this arrangement, the rib means 38 includes a first rib member 46 which integrally extends from the underbody surface 36 along a major arc of the carriage member 14. The rib member 46 has a smooth exterior surface which makes gliding, line contact with the first glide surface 40. The rib means 38 also includes second and third rib members 48 and 50 which respectively extend from the underbody surface 36 along opposite sides of the first rib member 46. Each second and third rib members 48 and 50, like the first rib member 46, has a smooth exterior surface which makes gliding, line contact with, respectively, the second and third glide surfaces 42 and 44.

Preferably, an air void or vapor barrier 64 is formed by conventional methods during rotational molding between the upper body surface 30 and the underbody surface 36 of the carriage member 14. This air void 64 serves as a cushion to increase passenger comfort as well as to insulate the seat 32 of the carriage member 14 from the underbody portion 36. Heat which may be generated during gliding contact between the rib members 46, 48, and 50 and the glide surfaces 40, 42, and 44 can thus be dissipated to the greatest extent possible.

Also, by virtue of this construction, the carriage member 14 is resiliently flexible and may be deformed for insertion into and removed from the cavity 20 through the access opening 28. Thus, the carriage member 14 may be readily removed from the cavity 20, if necessary, for repair or replacement.

It should be appreciated that, in lieu of the illustrated arrangement, the ribs could be integrally formed on the inner peripheral surface 18 of the wheel member 12. In this arrangement, the carriage underbody surface 36 would be polished or smoothed to effect a relatively frictionless interface with the ribs on the inner peripheral surface 18.

In the preferred embodiment, the carriage member 14 includes an integrally formed lip 52 having a generally smooth underbody portion 54. The lip underbody portion 54 makes gliding contact with each of the sidewall inner edges 24 in the same fashion that the rib members 46, 48, and 50 make gliding contact with the glide surfaces 40, 42, and 44. The lip 52 is thus operative in combination with the rib members 46, 48, and 50 for supporting the carriage member 14 in a non-rotating position in the interior cavity 20.

While the lip 52 may be variously constructed, in the preferred embodiment, the lip includes a hooked end portion 56 which overlies a portion of the respective sidewall 22 adjacent to the inner edge 24 thereof. As can be seen in FIG. 1, the hooked end portion 56 serves as a hand rest for the passenger seated on the carriage member 14.

Also, in the illustrated embodiment, the hooked end portion 56 of the lip 52 includes a spaced pair of notches 58 which define therebetween a braking portion 60 which, by virtue of the polyolefinic compound utilized, is resiliently movable by the passenger toward the adjacent sidewall 22. The braking portion 60 is thus operative in response to squeezing by the operator for movement from a normal position (shown in solid lines in FIG. 3) spaced from the sidewall 22 to a displaced position (shown in phantom lines in FIG. 3) making rubbing contact against the sidewall 22. The rubbing contact serves to impede rotation of the wheel member 12 about the carriage member 14, thereby slowing the rate of travel of the wheel member 12.

It should be appreciated that the recreational toy wheel vehicle 10 as herein described has essentially only one moving part (i.e. the carriage member 14). It is easily constructed and mechanically straightforward in design, operation, and repair. The vehicle 10 can be manufactured at a relatively low cost and provide hours of fun, entertainment, and exercise with an absoutely minimal chance of mechanical failure or mishap.

Various of the features of the invention are set forth in the following claims.

I claim:

1. A recreational toy wheel vehicle comprising a generally annular wheel member having an outer peripheral rolling surface and a generally smooth inner peripheral surface area defining a generally circular, axially extending interior cavity, and an arcuately shaped carriage member including a seat portion and generally smooth rib means operative for making gliding contact with said generally smooth inner peripheral surface area of said wheel member and for supporting said carriage member within said interior cavity in a nonrotating position during rotation of said wheel member on said rolling surface, said wheel member further having spaced sidewalls respectively extending from opposite lateral sides of said rolling surface, each of said sidewalls including a generally smooth inner edge radially spaced about the axis of wheel member rotation and peripherally defining a generally circular opening providing access into said interior cavity, and said carriage member further having lip means making gliding contact with each of said sidewall inner edges and operative in combination with said rib means for supporting said carriage member in said non-rotating position in said interior cavity.

2. A toy wheel vehicle according to claim 1 wherein said lip means includes a hooked end portion overlying a portion of said respective sidewall adjacent to said inner edge thereof and providing a hand rest for a passenger seated on said seat portion of said carriage member.

3. A toy wheel vehicle according to claim 2 wherein said hooked end portion of said lip means includes a movable braking portion selectively operative for rubbing contact against said sidewall portion to impede rotation of said outer wheel member about said carriage member.

4. A recreational toy wheel vehicle comprising a generally annular wheel member having an outer peripheral rolling surface and a generally smooth inner peripheral surface area defining a generally circular, axially extending interior cavity, said outer wheel member being constructed of an opaque material and including means defining a plurality of translucent windows arcuately spaced about said rolling surface and communicating with said interior cavity, and an arcuately shaped carriage member including a seat portion and generally smooth rib means operative for making gliding contact with said generally smooth inner peripheral surface area of said wheel member and for supporting said carriage member within said interior cavity in a non-rotating position during rotation of said wheel member on said rolling surface.

5. A recreational toy wheel vehicle comprising a generally annular wheel member having an outer peripheral rolling surface and a generally smooth inner peripheral surface area defining a generally circular, axially extending interior cavity, and an arcuately shaped carriage member including a seat portion and generally smooth integrally formed rib means operative for making gliding contact with said generally smooth inner peripheral surface area of said wheel member and for supporting said carriage member within said interior cavity in a nonrotating position during rotation of said wheel member on said rolling surface, said wheel member further having spaced sidewalls respectively extending from opposite lateral sides of said rolling surface, each of said sidewalls including a generally smooth inner edge radially spaced about the axis of wheel member rotation and peripherally defining a generally circular opening providing access into said interior cavity, and said carriage member further having lip means making gliding contact with each of said sidewall inner edges and operative in combination with said rib means for supporting said carriage member in said nonrotating position in said interior cavity.

6. A toy wheel vehicle according to claim 5 wherein said lip means includes a hooked end portion overlying a portion of said respective sidewall adjacent to said inner edge thereof and providing a hand rest for a passenger seated on said seat portion of said carriage member.

7. A toy wheel vehicle according to claim 6 wherein said hooked end portion of said lip means includes a movable braking portion selectively operative for rubbing contact against said sidewall portion to impede rotation of said outer wheel member about said carriage member.

8. A recreational toy wheel vehicle comprising a generally annular wheel member having an outer peripheral rolling surface and a generally smooth inner peripheral surface area defining a generally circular, axially extending interior cavity, said outer wheel member being constructed of an opaque material and including means defining a plurality of translucent windows arcuately spaced about said rolling surface and communicating with said interior cavity, and an arcuately shaped carriage member including a seat portion and generally smooth integrally formed rib means operative for making gliding contact with said generally smooth inner peripheral surface area of said wheel member and for supporting said carriage member within said interior cavity in a nonrotating position during rotation of said wheel member on said rolling surface.

* * * * *